(12) United States Patent
Li et al.

(10) Patent No.: US 11,215,876 B2
(45) Date of Patent: Jan. 4, 2022

(54) BACKLIGHT SOURCE, BACKLIGHT MODULE AND DISPLAY DEVICE

(71) Applicants: CHONGQING BOE OPTOELECTRONICS TECHNOLOGY CO., LTD., Chongqing (CN); BOE TECHNOLOGY GROUP CO., LTD., Beijing (CN)

(72) Inventors: Xiaoji Li, Beijing (CN); Yanli Zhao, Beijing (CN); Peng Li, Beijing (CN); Zhe Li, Beijing (CN); Wei Zhu, Beijing (CN); Lan Xin, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 86 days.

(21) Appl. No.: 16/632,137

(22) PCT Filed: Jan. 31, 2019

(86) PCT No.: PCT/CN2019/074204
§ 371 (c)(1),
(2) Date: Jan. 17, 2020

(87) PCT Pub. No.: WO2020/155027
PCT Pub. Date: Aug. 6, 2020

(65) Prior Publication Data
US 2021/0223593 A1    Jul. 22, 2021

(51) Int. Cl.
*G02F 1/13357*    (2006.01)
*G02F 1/1335*    (2006.01)
(Continued)

(52) U.S. Cl.
CPC ....... *G02F 1/13362* (2013.01); *G02B 6/0051* (2013.01); *G02B 17/0856* (2013.01); *G02F 1/133528* (2013.01); *G02F 1/133614* (2021.01)

(58) Field of Classification Search
CPC ........... G02F 1/13362; G02F 1/133528; G02F 1/133614; G02B 17/0856; G02B 6/0051
See application file for complete search history.

(56) References Cited

U.S. PATENT DOCUMENTS

2007/0076432 A1    4/2007  Yang et al.
2016/0245983 A1*   8/2016  Lien ..................... G02B 6/0038

FOREIGN PATENT DOCUMENTS

CN    1588196 A    3/2005
CN    1900785 A    1/2007
(Continued)

*Primary Examiner* — Donald L Raleigh
(74) *Attorney, Agent, or Firm* — Dilworth & Barrese, LLP.; Michael J. Musella, Esq.

(57) ABSTRACT

A backlight source, a backlight module and a display device are provided. The backlight source includes a light source and a polarizer component, the light source is configured to emit light to the polarizer component, the polarizer component is configured to convert the light emitted from the light source into polarized light, and the polarizer component includes a birefringent material. The backlight source emits linearly polarized light by using the birefringent material.

19 Claims, 7 Drawing Sheets

(51) Int. Cl.
*F21V 8/00* (2006.01)
*G02B 17/08* (2006.01)

(56) References Cited

FOREIGN PATENT DOCUMENTS

| | | |
|---|---|---|
| CN | 103293650 A | 9/2013 |
| CN | 103629622 A | 3/2014 |
| CN | 205299279 U | 6/2016 |

* cited by examiner incident angel of E light

BACKLIGHT SOURCE, BACKLIGHT MODULE AND DISPLAY DEVICE

TECHNICAL FIELD

At least one embodiment of the present disclosure relates to a backlight source, a backlight module and a display device.

BACKGROUND

A display product such as a liquid crystal display panel needs a backlight module to provide light for display, and two polarizers need to be provided in the liquid crystal display panel to convert light from the backlight module into a polarized light for display. In this way, the liquid crystal display panel has low light transmittance, and this results in low brightness of a displayed image, so that it is difficult to meet users' requirements on visual effects of the display product.

SUMMARY

At least one embodiment of the present disclosure provides a backlight source including a light source and a polarizer component. The light source is configured to emit light to the polarizer component, the polarizer component is configured to convert the light emitted from the light source into polarized light, and the polarizer component includes a birefringent material.

For example, the polarizer component comprises: a refractor, comprising a first light incident surface and a first light-outgoing surface which are opposite to each other, and comprising a second light-outgoing surface provided between the first light incident surface and the first light-outgoing surface. The first light-outgoing surface is on a light-outgoing side of the backlight source; the refractor comprises the birefringent material, the light emitted from the light source is decomposed into a first light ray having a first polarization direction and a second light ray having a second polarization direction after the light emitted from the light source enters the refractor, and the first polarization direction is perpendicular to the second polarization direction; and at the first light-outgoing surface, a portion of the first light ray is reflected as a first sub-ray, the other portion of the first light ray is refracted as a second sub-ray, and the second light ray is totally reflected.

For example, at the first light-outgoing surface, an incident angle of the first light ray is less than a total reflection critical angle of the first light ray, and an incident angle of the second light ray is not less than a total reflection critical angle of the second light ray; the incident angle of the first light ray is equal to the incident angle of the second light ray, and the total reflection critical angle of the first light ray is greater than the total reflection critical angle of the second light ray.

For example, the refractor comprises a first cross-section, and the first cross section comprises a first edge at the first light incident surface, a second edge at the first light-outgoing surface and a third edge at the second light-outgoing surface; and a shape of the first cross section is a triangle comprising the first edge, the second edge and the third edge.

For example, the refractor comprises a first cross-section, and the first cross section comprises a first edge at the first light incident surface, a second edge at the first light-outgoing surface, and a third edge at the second light-outgoing surface; and a shape of the first cross section is a quadrangle or a polygon.

For example, a direction of the light emitted from the light source is perpendicular to the first light incident surface, the incident angle of the first light ray at the first light-outgoing surface and the incident angle of the second light ray at the first light-outgoing surface are θ, a length of the first edge is a, a length of a portion which is comprised by the second edge and which overlaps the first edge in a direction perpendicular to the first light incident surface is b, and a and b satisfy b=a/sin (90°−θ).

For example, a direction of the light emitted from the light source is perpendicular to the first light incident surface; and the second light-outgoing surface is in a light path of the first sub-ray and the second light ray which are reflected by the first light-outgoing surface, and the first sub-ray and the second light ray are refracted at the second light-outgoing surface.

For example, the polarizer component further comprises: a light conversion layer in a light path of light emitted from the second light-outgoing surface; the light conversion layer is configured to absorb a portion which is comprised by the first sub-ray and which is emitted from the second light-outgoing surface, and is configured to convert a portion which is comprised by the second light ray and which is emitted from the second light-outgoing surface into light having the first polarization direction.

For example, the light conversion layer comprises a first polarizing layer and a half-wave plate, the first polarizing layer and the half-wave plate are sequentially disposed in a light path of the light emitted from the refractor, and an absorption axis of the first polarizing layer is parallel to the first polarization direction and is perpendicular to the second polarization direction; or the light conversion layer comprises a second polarizing layer and the half-wave plate, the half-wave plate and the second polarizing layer are sequentially disposed in the light path of the light emitted from the refractor, and an absorption axis of the second polarizing layer is parallel to the second polarization direction and is perpendicular to the first polarization direction.

For example, the light conversion layer comprises a second polarizing layer, and the second polarizing layer is in the light path of the light emitted from the second light-outgoing surface; and an absorption axis of the second polarizing layer is parallel to the second polarization direction and is perpendicular to the first polarization direction.

For example, the polarizer component further comprises: a reflector in the light path of the light emitted from the second light-outgoing surface; the reflector is configured to adjust a direction of the light emitted from the second light-outgoing surface so that the light emitted from the second light-outgoing surface is emitted from the light-outgoing side of the backlight source.

For example, along the light path of the light emitted from the second light-outgoing surface, the light conversion layer and the reflector are sequentially disposed, or the reflector and the light conversion layer are sequentially disposed.

For example, the polarizer component further comprises: a reflector provided between the first polarizing layer and the half-wave plate along the light path of the light emitted from the second light-outgoing surface or provided between the second polarizing layer and the half-wave plate along the light path of the light emitted from the second light-outgoing surface; the reflector is configured to adjust a direction of the light emitted from the second light-outgoing surface so that the light emitted from the second light-outgoing surface is emitted from the light-outgoing side of the backlight source.

For example, the refractor further comprises a third surface, the third surface and the second light-outgoing surface are sequentially disposed in a light path of light reflected by the first light-outgoing surface, at least a portion of the first sub-ray and the second light ray is reflected at the third surface and is refracted at the second light-outgoing surface, and the second light-outgoing surface is on the light-outgoing side of the backlight source.

For example, an incident angle of the second light ray at the third surface is not less than a total reflection critical angle of the second light ray at the third surface.

For example, the third surface is parallel to the first light-outgoing surface, and the second light-outgoing surface is parallel to the first light incident surface.

For example, an incident angle of the first sub-ray at the third surface is not less than a total reflection critical angle of the first sub-ray at the third surface.

For example, the light source comprises: a light emitter and a light direction controller element, and the light direction controller element is provided between the light emitter and the polarizer component; the light direction controller element is configured to adjust light emitted from the light emitter into a parallel light beam which is incident into the refractor.

For example, the light direction controller element comprises a paraboloidal reflector and a Fresnel lens, the light emitter is at a focal point of the paraboloidal reflector, the Fresnel lens is provided between the light emitter and the polarizer component, and a center of the Fresnel lens is at an axis of the paraboloidal reflector.

At least one embodiment of the present disclosure provides a backlight module including the backlight source in any one of the above embodiments.

For example, the backlight module provided by at least one embodiment of the present disclosure further includes a light guide plate including a light incident surface and a light-outgoing surface; the light emitted from the backlight source enters the light guide plate at the light incident surface and exits the light guide plate at the light-outgoing surface.

At least one embodiment of the present disclosure provides a display device including the backlight module according to any one of the above embodiments.

For example, the display device provided by at least one embodiment of the present disclosure further includes a transmissive liquid crystal display panel, the liquid crystal display panel includes a third polarizing layer on a display side, and the backlight module is on a non-display side of the liquid crystal display panel.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1:
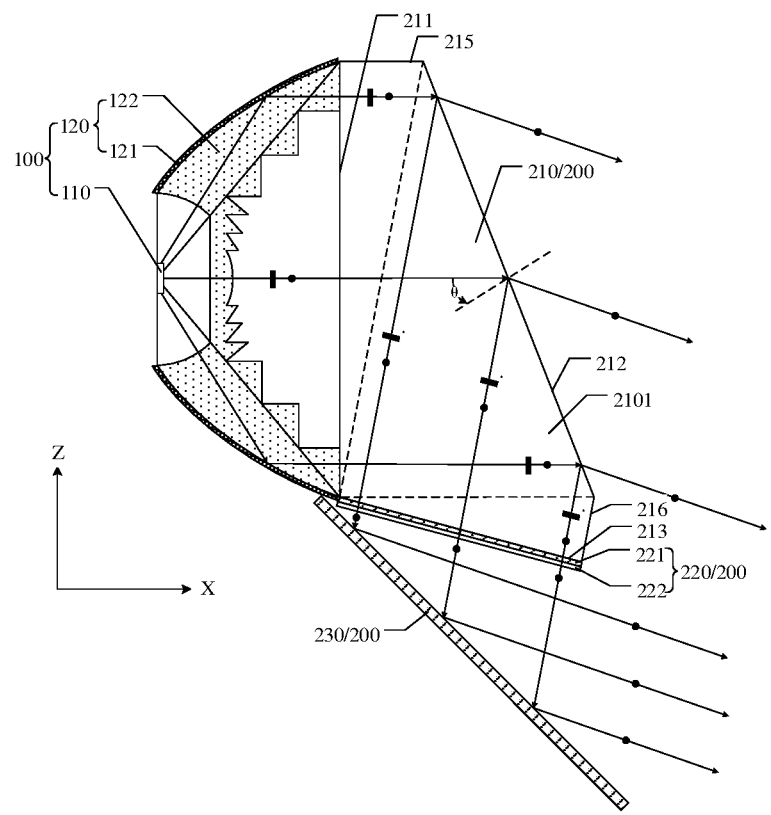
FIG. 1 is a cross-sectional view of a backlight source provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Some electronic display products, such as a liquid crystal display panel, requires a backlight source to provide light for displaying an image. The backlight source emits non-polarized light, the liquid crystal display panel needs two polarizers which respectively are an upper polarizer and a lower polarizer, the lower polarizer converts the non-polarized light emitted from the backlight source into linearly polarized light, and variations of brightness of the linearly polarized light is realized by means of modulation of liquid crystal molecules and by means of the upper polarizer. The two polarizers absorb the light emitted from the backlight module, which causes that an utilization rate of the light emitted from the backlight module is low, and that brightness of the displayed image is low and is usually below 50%; furthermore, arrangement of the two polarizers results in a complicated structure of the display panel, increases a manufacturing process of the display panel and is not conducive to a thin and light design of the display panel.

At least one embodiment of the present disclosure provides a backlight source including a light source and a polarizer component. The light source is configured to emit light to the polarizer component, the polarizer component is in a light path of the light emitted from the light source and is configured to convert the light emitted from the light source into polarized light, and the polarizer component includes a birefringent material. The birefringent material is anisotropic and is capable of decomposing incident light into linearly polarized light. In this way, by using the birefringent material, the polarizer component is capable of decomposing the light emitted from the light source into the linearly polarized light, so that the backlight source provides the linearly polarized light. For example, in a situation where the backlight source is used in the liquid crystal display device, the liquid crystal display panel of the liquid crystal display device only needs to be provided with one polarizer to realize display, which simplifies a structure of the display panel and facilitates a thin and light design of the display panel and the display device.

Hereinafter, the backlight source, a backlight module and a display device according to at least one embodiment of the present disclosure will be described with reference to the drawings.

At least one embodiment of the present disclosure provides the backlight source. As shown in FIG. 1, the backlight source includes a light source 100 and a polarizer component 200. The light source 100 is configured to emit light, the polarizer component 200 is in the light path of the light emitted from the light source 100 and is configured to convert the light emitted from the light source 100 into the polarized light, and the polarizer component 200 includes the birefringent material. For example, the polarizer component 200 includes a refractor 210 formed of the birefringent material. A crystal formed of the birefringent material is capable of decomposing incident light into O light and E light, each of the O light and the E light is linearly polarized light, and the crystal formed of the same birefringent material has different refractive indexes for the O light and the E light. In this way, by using a difference between the refractive index of the O light and the refractive index of the E light, the O light and the E light for example are emitted from different surfaces of the refractor, so that the polarizer component emits the light (the O light or the E light) having a single polarization direction, for example.

In a situation where light is incident to an anisotropic crystal (a crystal with a single optical axis, such as calcite, quartz, ruby or the like), refractions occur in two different directions. For the crystal with the single optical axis, in a situation where a polarization direction of light is perpendicular to the optical axis, a refractive index of the light is an ordinary refractive index, and the light having the polarization direction perpendicular to the optical axis is called as the O light (ordinary ray, ordinary light); another light has a polarization direction parallel to the optical axis and is called as the E light (extraordinary ray, extraordinary light); and both the O light and the E light are linearly polarized light. For example, a material of the crystal is a positive single optical axis material; and in the crystal, the refractive index of the ordinary light (O light) is greater than a refractive index of the extraordinary light (E light). For example, the material of the crystal is a negative single optical axis material; and in the crystal, the refractive index of the ordinary light (O light) is less than the refractive index of the extraordinary light (E light).

For example, the refractor is a uniaxial crystal (i.e. the crystal with a single optical axis) formed of the birefringent material. For example, the birefringent material includes calcite, lithium niobate, lithium tantalate, quartz, or the like.

For example, in the backlight source provided by at least one embodiment of the present disclosure, the polarizer component includes the refractor, and the refractor includes a first light incident surface and a first light-outgoing surface which are opposite to each other and the refractor further includes a second light-outgoing surface located between the first light incident surface and the first light-outgoing surface; the refractor includes the birefringent material, and the light emitted from the light source is decomposed into a first light ray having a first polarization direction and a second light ray having a second polarization direction after the light emitted from the light source enters the refractor, and the first polarization direction is perpendicular to the second polarization direction; at the first light-outgoing surface, a portion of the first light ray is reflected as a first sub-ray, another portion of the first light ray is refracted as a second sub-ray, and the second light ray is totally reflected. In this way, the first light-outgoing surface of the refractor emits only the second sub-ray, so that a light-outgoing side of the backlight source emits, for example, the linearly polarized light having the first polarization direction. For example, a side that the first light-outgoing surface of the refractor is provided is the light-outgoing side of the backlight source. In a situation where the backlight source is used in the display device, the polarized light (for example, the second sub-ray) which is emitted from the first light-outgoing surface and which has the first polarization direction is used for displaying the image.

Because the refractive index of the refractor is larger than a refractive index of an external medium (such as air), the O light and the E light propagate from high refractive index material to low refractive index material, and total reflection, partial refraction or partial reflection occur according to the incident angle. In the refractor formed of the birefringent material, the refractive index of the E light and the refractive index of the O light are different, so the total reflection critical angle of the E light and the total reflection critical angle of the O light at a same surface of the refractor are different. Therefore, by selecting the material of the refractor and controlling the incident angle of the O light and the incident angle of the E light, for example, one of the E light and the O light is totally reflected at the surface of the refractor, and the other of the E light and the O light is partially refracted, so that the surface of the refractor emits only the E light or the O light.

For example, in some embodiments of the present disclosure, the material of the refractor is the positive single optical axis material. In this refractor, the refractive index of the O light is larger than the refractive index of the E light (extraordinary light), and the total reflection critical angle of the E light is greater than the total reflection critical angle of the O light at the first light-outgoing surface of the refractor. Therefore, in a situation where the incident angle of the E light and the incident angle of the O light at the first light-outgoing surface are controlled, for example, the E light is partially reflected and partially refracted, and the O light is totally reflected.

For example, in other embodiments of the present disclosure, the material of the refractor is the negative single optical axis material. In this refractor, the refractive index of the O light is less than the refractive index of the E light (extraordinary light). At the first light-outgoing surface of the refractor, the total reflection critical angle of the E light is less than the total reflection critical angle of the O light. Therefore, in the situation where the incident angle of the E light and the incident angle of the O light at the first light-outgoing surface are controlled, for example, the O light is partially reflected and partially refracted, and the E light is totally reflected.

For example, as shown in FIG. 1, the material of the refractor 210 is the positive single optical axis material, and the refractor 210 includes the first light incident surface 211, the first light-outgoing surface 212 and the second light-outgoing surface 213. The light emitted from the light source enters the refractor 210 through the first light incident surface 211, and is decomposed into the O light and the E light in the refractor 210. At the first light-outgoing surface 212, because the refractive index of the refractor 210 is greater than the refractive index of the external medium (for example, air), the O light and the E light propagate from the high refractive index material to the low refractive index material, and the total reflection, the partial refraction or the partial reflection occur according to the incident angle. In the refractor 210 formed of the birefringent material, the total reflection critical angle of the E light is greater than the total reflection critical angle of the O light. Therefore, by controlling the incident angle of the O light and the incident angle of the E light, for example, the O light is totally reflected at the first light-outgoing surface 212, and meanwhile the E light is partially refracted, so that the first light-outgoing surface 212 does not emit the O light and emits a portion of the E light. For example, the first light ray is the E light and the second light ray is the O light; correspondingly, the first light ray has the first polarization direction (indicated by a symbol "•"), and the second light ray has the second polarization direction (indicated by a symbol "|") that is perpendicular to the first polarization direction. For example, taking the X-Z rectangular coordinate system in FIG. 1 as a reference, a direction close to a positive direction of the X-axis is the light-outgoing direction of the backlight source.

It should be noted that, in a situation where the material of the refractor 210 shown in FIG. 1 is the negative single optical axis material, the E light is totally reflected at the first light-outgoing surface 212 and the O light is partially refracted, that is, the symbol "|" represents the E light, and the symbol "•" represent the O light.

In the following, taking the case that the material of the refractor is the positive single optical axis material as an example, the technical solution in at least one of the following embodiments of the present disclosure is described, where the first light ray is the E light and the second light ray is the O light.

For example, in the backlight source provided by at least one embodiment of the present disclosure, at the first light-outgoing surface, an incident angle of the first light ray is less than a total reflection critical angle of the first light ray, and an incident angle of the second light ray is not less than a total reflection critical angle of the second light ray. For example, in some embodiments of the present disclosure, the incident angle of the first light ray is equal to the incident angle of the second light ray, and the total reflection critical angle of the first light ray is greater than the total reflection critical angle of the second light ray. In a situation where light is incident from an optically denser medium to an optically thinner medium and has an incident angle at an interface between the optically denser medium and the optically thinner medium not less than the total reflection critical angle, the light is totally reflected at the interface; if the incident angle is less than the total reflection critical angle, the light is partially reflected and partially refracted at the interface. For example, the total reflection critical angle of the O light at the first light-outgoing surface of the refractor is $\theta_O$, the total reflection critical angle of the E light at the first light-outgoing surface of the refractor is $\theta_E$, and in the situation where the material of the refractor is the positive single optical axis material, it is obtained that $\theta_E > \theta_O$ according to the property of the birefringent material. For example, as shown in FIG. 1, the incident angle of the first light ray and the incident angle of the second light ray at the first light-outgoing surface 212 are equal and are denoted as $\theta$. In the case of $\theta_O \le \theta < \theta_E$, at the first light-outgoing surface 212, the first light ray is partially reflected and partially refracted and the second light ray is totally reflected.

For example, the light source is configured such that the light emitted from the light source is a parallel light beam, and the light perpendicularly enters the first light incident surface of the refractor. In this way, the light entering the refractor from the first light incident surface is decomposed into the first light ray and the second light ray, and then the first light ray and the second light ray have a same propagation direction in the refractor, so that the first light ray and the second light ray have the same incident angle at the first light-outgoing surface. In this way, it is beneficial to calculate the light path of the first light ray and the light path of the second light ray in the refractor, and it is helpful to design a shape of the refractor.

In the following, the technical solution of at least one embodiment of the present disclosure as follows will be described by taking the case that the incident angle of the first light ray and the incident angle of the second light ray at the first light-outgoing surface are equal as an example.

For example, in at least one embodiment of the present disclosure, the first light incident surface of the refractor allows the light emitted from the light source to enter the refractor, the first light-outgoing surface allows the first light ray to be partially refracted and allows the second light ray to be totally reflected, and the first light ray and the second light ray are emitted from the second light-outgoing surface. Under the above conditions, the shape of the refractor can be determined according to actual needs.

For example, in the backlight source provided by at least one embodiment of the present disclosure, the refractor includes a first cross section, and the first cross section includes a first edge located at the first light incident surface, a second edge located at the first light-outgoing surface, and a third edge located at the second light-outgoing surface; and a shape of the first cross section is a quadrangle or a polygon. For example, as shown in FIG. 1, the refractor 210 includes the first light incident surface 211, the first light-outgoing surface 212 and the second light-outgoing surface 213 which are sequentially connected, the first light incident surface 211, the first light-outgoing surface 212 and the second light-outgoing surface 213 cross each other, so that the first light ray is partially refracted at the first light-outgoing surface 212 and the second light ray is totally reflected at the first light-outgoing surface 212. A portion which is included by the first light ray and which is reflected at the first light-outgoing surface 212 is the first sub-ray, another portion which is included by the first light ray and which is refracted at the first light-outgoing surface 212 to emit out from the refractor is the second sub-ray, and the first sub-ray and the second light ray are transmitted through the second light-outgoing surface 213 to emit out from the refractor 210. FIG. 1 is a cross-sectional view of the backlight source and illustrates the first cross section 2101 of the refractor 210 taken along X-Z. The first cross section 2101 includes the first edge corresponding to the first light incident surface 211, the second edge corresponding to the first light-outgoing surface 212, and the third edge corresponding to the second light-outgoing surface 213. For example, a fifth surface 215 is provided between the first light incident surface 211 and the first light-outgoing surface 212, and a sixth surface 216 is provided between the first light-outgoing surface 212 and the second light-outgoing surface 213. The fifth surface 215 and the sixth surface 216 for example reduce a design size of the refractor 210, which is beneficial to the miniaturization of the backlight source.

For example, as shown in FIG. 1, in a Z-axis direction, a width of the first edge at the first light incident surface 211 is equal to a width of a light-emitting region of the light source 100, and the fifth surface 215 is substantially perpendicular to the first light incident surface 211. As such, the size of the refractor 210 in the Z-axis direction is relatively small. In an X-axis direction, the fifth surface 215 has a certain width, so that the first light ray (specifically, the first sub-ray of the first light ray) and the second light ray are reflected at the first light-outgoing surface 212 and then are directed toward the second light-outgoing surface 213, instead of being directed toward the first light incident surface 211, and thus the first light ray (specifically, the first sub-ray of the first light ray) and the second light ray are prevented from being reflected or refracted at the first light incident surface 211 to generate an interference light ray. The width of the fifth surface 215 in the X-axis direction is related to the material and shape of the refractor, and can be designed according to the actual situation, which is not described herein. For example, the sixth surface 216 is parallel to the propagation direction of the second light ray after the second light ray is reflected at the first light-outgoing surface 212; and in the situation where the light emitted from the light source 100 enters the refractor 210 in a manner of being perpendicular to the first light incident surface 211, an orthographic projection of the first light-outgoing surface 212 on the first light incident surface 211 coincides with the first light incident surface 211. In this way, any region of the refractor 210 in FIG. 1 is used for light transmission, and a total volume of the refractor 210 is minimized while ensuring the function of the backlight source.

For example, in the backlight source provided by at least one embodiment of the present disclosure, the incident angle of the first light ray and the incident angle of the second light ray at the first light-outgoing surface are θ, a length of the first edge is a, a length of a portion which is included by the second edge and which overlaps the first edge in a direction perpendicular to the first light incident surface is b, and a and b satisfy b=a/sin (90°−θ). For example, as shown in FIG. 1, the orthographic projection of the first light-outgoing surface 212 on the first light incident surface 211 coincides with the first light incident surface 211, and a length of the first light-outgoing surface 212 in the X-Z plane is b.

According to Fresnel formula, during a process that the light enters into the optically thinner medium from the optically denser medium, a reflectance of the light at the interface between the optically denser medium and the optically thinner medium is R=[sin ($\theta_{in}-\theta_{out}$)/sin ($\theta_{in}+\theta_{out}$)]$^2$, and $n_{in}$ sin $\theta_{in}=n_{out}$ sin $\theta_{out}$, where $n_{in}$ is a refractive index of the light in the optically denser medium, $n_{out}$ is a refractive index of the light in the optically thinner medium, R is the reflectance, $\theta_{in}$ is an incident angle, and $\theta_{out}$ is an outgoing angle. In at least one embodiment of the present disclosure, according to the above formula, in a case where the incident angle of the light at the first light-outgoing surface is less than the total reflection critical angle of the first light ray and is not less than the total reflection critical angle of the second light ray, the transmittance of the first light ray at the first light-outgoing surface is related to a value of the incident angle, the greater the transmittance of the first light ray at the first light-outgoing surface, the more the portion (i.e. the second sub-ray) which is included by the first light ray and which is emitted out from the first light-outgoing surface, and this increases the utilization rate of the first light ray; at the second light-outgoing surface, the reflectance of each of the first sub-ray and the second light ray is related to the incident angle of the light, the smaller the reflectance of each of the first sub-ray and the second light ray at the second light-outgoing surface, the more the first sub-ray and the second light ray are emitted out from the refractor, and accordingly, the less interference light ray generated due to the reason that the first sub-ray and the second light ray are reflected at the second light-outgoing surface.

Figure 2A:
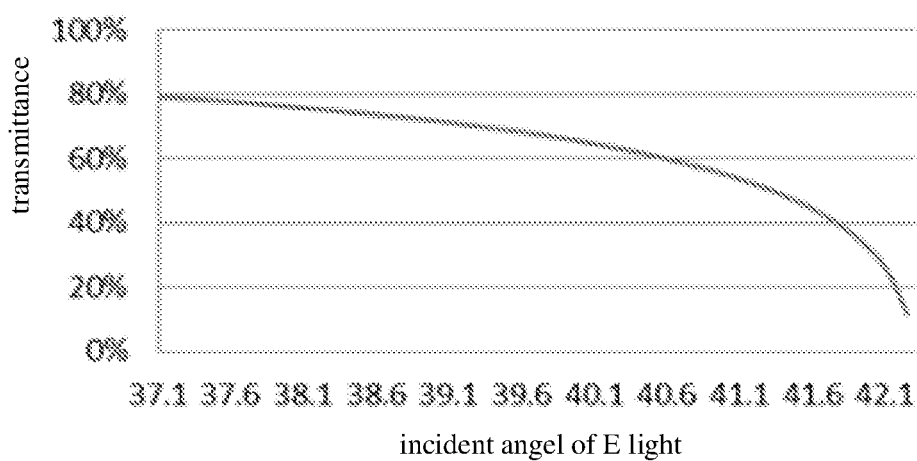
FIG. 2A is a relationship diagram of an incident angle and transmittance of E light in FIG. 1 at a first light-outgoing surface of a refractor.
Figure 2B:
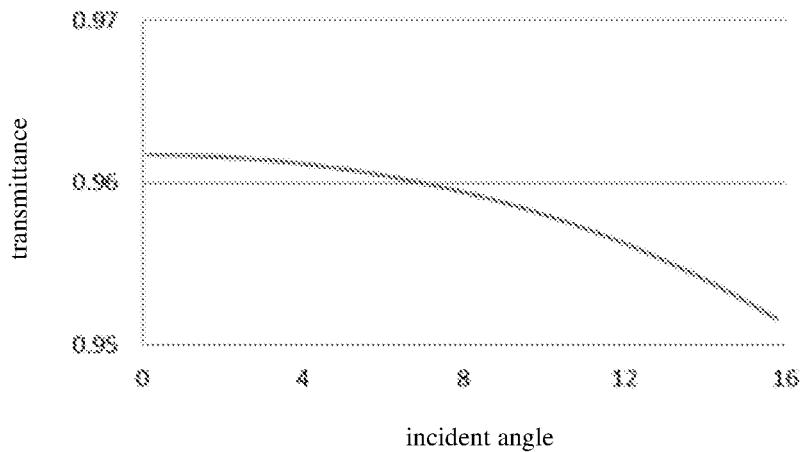
FIG. 2B is a relationship diagram of an incident angle and transmittance of light in FIG. 1 at a second light-outgoing surface of the refractor.

FIG. 2A is a relationship diagram of the incident angle and the transmittance of the E light in FIG. 1 at the first light-outgoing surface of the refractor, and FIG. 2B is a relationship diagram of the incident angle and the transmission of the light in FIG. 1 at the second light-outgoing surface of the refractor, where the E light has the first polarization direction and the O light has the second polarization direction.

As shown in FIGS. 1 and 2A, as the incident angle of the first light ray (E light) at the first light-outgoing surface 212 increases, the transmittance of the first light ray decreases and the reflectance of the first light ray increases. In this way, the incident angle of the light at the first light-outgoing surface 212 is set to be equal to the total reflection critical angle of the second light ray, which ensures that the second light ray is totally reflected at the first light-outgoing surface 212 and meanwhile the first light ray has the highest transmittance at the first light-outgoing surface 212. As shown in FIGS. 1 and 2B, as the incident angle of the light (the first sub-ray and the second light ray) at the second light-outgoing surface 213 decreases, the transmittance of the light at the second light-outgoing surface decreases, and the reflectance of the light at the second light-outgoing surface increases, such that in the situation where the incident angle of the light at the second light-outgoing surface is 0°, the light has the highest transmittance at the second light-outgoing surface.

For example, the material of the refractor 210 is calcite, the refractive index of the E light is $n_e=1.4864$, the refractive index of the O light is $n_o=1.6584$, the total reflection critical angle of the E light is 42.3°, the total reflection critical angle of the O light is 37.1°, and the refraction angle of the E light at the first light-outgoing surface is 63.7°. As shown in FIGS. 1, 2A and 2B, in a situation where the incident angle of the first light ray at the first light-outgoing surface is 37.1°, the transmittance of the first light ray at the first light-outgoing surface reaches 80%; in a situation where the incident angle of each of the first sub-ray and the second light ray at the second light-outgoing surface is 0°, the transmittance of each of the first sub-ray and the second light ray at the second light-outgoing surface reaches more than 96%.

For example, an incident angle of the parallel light beam emitted from the light source 100 at the first light incident surface 211 is 0°, the incident angle of each of the first light ray (E light) and the second light ray (O light) at the first light-outgoing surface 212 is equal to the total reflection critical angle ($\theta$=37.1°) of the second light ray, and the incident angle of each of the first sub-ray and the second light ray is 0° at the second light-outgoing surface 213. The refractor 210 has the first cross section 2101 in the X-Z plane, and the first cross section 2101 includes the first edge a at the first light incident surface 211, the second edge b at the first light-outgoing surface 212, the third edge c at the second light-outgoing surface 213, a fourth edge d at the fifth surface 215, and a fifth edge e at the sixth surface 216. For example, in some embodiments of the present disclosure, for example, the relationships between a, b, c, d and e are defined in the following formulas (1), (2), (3), and (4):

$$b=a/\sin(90°-\theta)=a/\sin 52.9° \quad (1);$$

$$c=[a+b\times\cos(90°-\theta)]\times\cos(90°-2\times\theta)=[a+b\times\cos 52.9°]\times\cos 15.8° \quad (2);$$

$$d=a\times\tan(90°-2\times\theta)=a\times\tan 15.8° \quad (3);$$

$$e=[a+b\times\cos(90°-\theta)]\times\sin(90°-2\times\theta)=[a+b\times\cos 15.8°]\times\sin 15.8° \quad (4).$$

Figure 3:
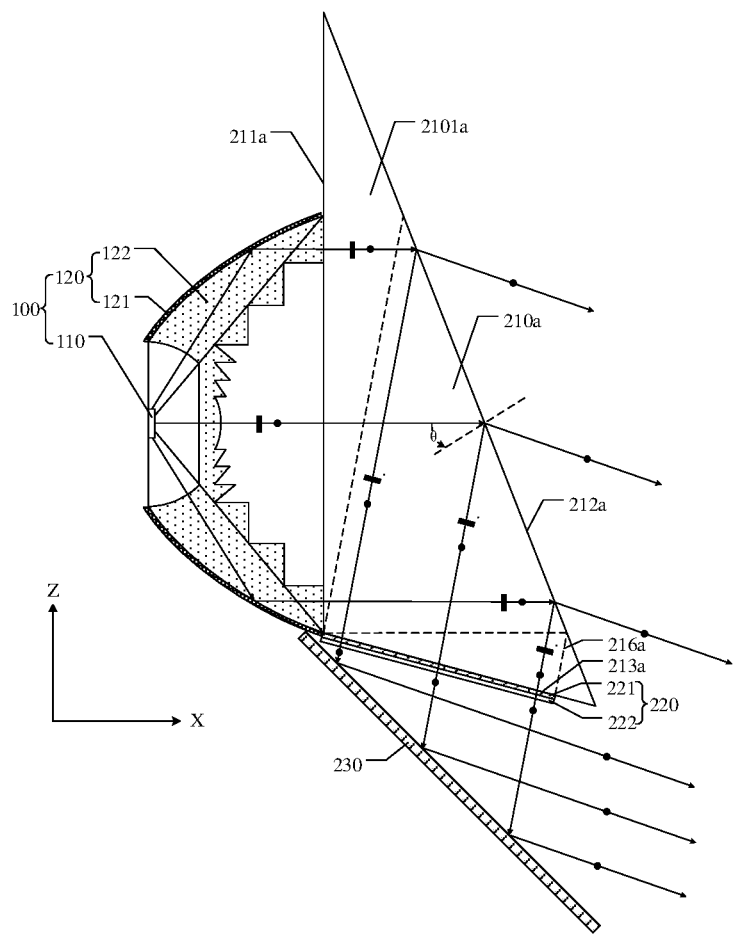
FIG. 3 is a cross-sectional view of the backlight source provided by some other embodiments of the present disclosure.

In at least one embodiment of the present disclosure, the structure of the refractor is not limited and can be designed according to actual needs. For example, the shape of the refractor shown in FIG. 1 may be changed. For example, in the backlight source provided by at least one embodiment of the present disclosure, the refractor includes the first cross section, and the first cross section includes the first edge located at the first light incident surface, the second edge located at the first light-outgoing surface and the third side located at the second light-outgoing surface; and the shape of the first cross section for example is a triangle including the first edge, the second edge and the third edge. For example, as shown in FIG. 3, the refractor 210a includes the first light incident surface 211a, the first light-outgoing surface 212a and the second light-outgoing surface 213a. For example, the first light incident surface 211 and the first light-outgoing surface 212 of the refractor 210 shown in FIG. 1 are extended to be modified into the first light incident surface 211a and the first light-outgoing surface 212a that are connected with each other as shown in FIG. 3, so that the fifth surface 215 of the refractor 210 shown in FIG. 1 is omitted; and the first light-outgoing surface 212 and the second light-outgoing surface 213 of the refractor 210 shown in FIG. 1 are extended to be modified into the first light-outgoing surface 212a and the second light-outgoing surface 213a that are connected with each other as shown in FIG. 3, so that the sixth surface 216 of the refractor 210 shown in FIG. 1 is omitted. In this way, as shown in FIG. 3, in the first cross section 2101a of the refractor 210a in the X-Z plane, the first edge located at the first light incident surface 211a, the second edge located at the first light-outgoing surface 212a and the third edge located at the second light-outgoing surface 213a form the triangle. For example, as shown in FIG. 3, the sixth surface 216 of FIG. 1 is used to cut the refractor 210a to form the sixth surface 216a; in this way, the shape of the first cross section of the refractor in the X-Z plane is a quadrangle, for example.

Figure 4:
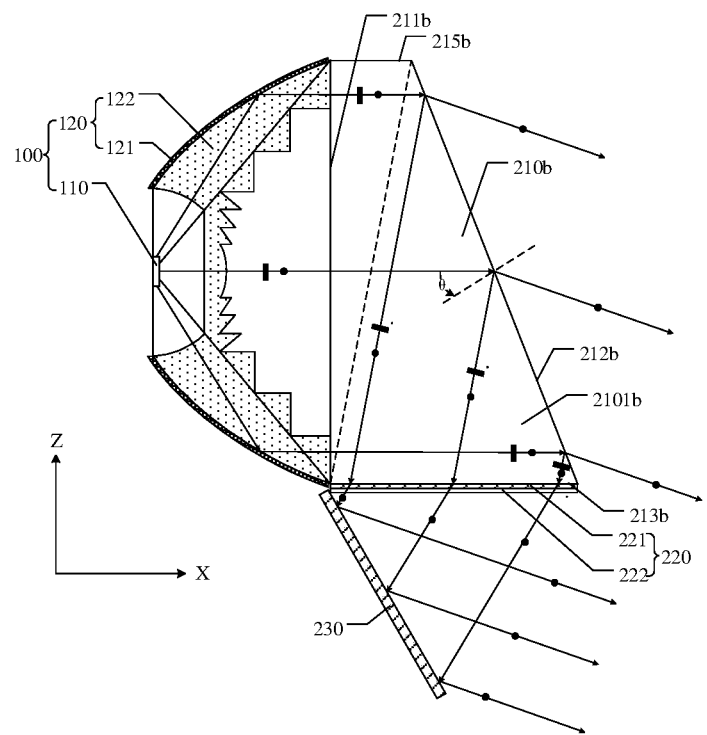
FIG. 4 is a cross-sectional view of the backlight source provided by some other embodiments of the present disclosure.

For example, in the backlight source provided by at least one embodiment of the present disclosure, the second light-outgoing surface is connected with the first light incident surface and is connected with the first light-outgoing surface. For example, the second light-outgoing surface is perpendicular to the first light incident surface. For example, as shown in FIG. 4, the refractor 210b includes the first light incident surface 211b, the first light-outgoing surface 212b, the second light-outgoing surface 213b and the fifth surface 215b. The first light incident surface 211b, the first light-outgoing surface 212b and the fifth surface 215b which are included in the refractor 210b for example reference to the first light incident surface 211, the first light-outgoing surface 212 and the fifth surface 215 shown in FIG. 1. At the second light-outgoing surface 213b, the incident angle of the light is less than the total reflection critical angle of each of the first sub-ray and the second light ray, so that the first sub-ray and the second light ray are refracted and emitted out from the second light-outgoing surface 213b of the refractor 210b. Referring to the refractor 210 shown in FIG. 1, the refractor 210 for example is cut in a direction perpendicular to the first light incident surface 211 to cut off the sixth surface 216, and a cut surface forms the second light-outgoing surface 213b in FIG. 4. In this way, in the first cross section 2101b of the refractor in the X-Z plane, the first edge located at the first light incident surface 211b, the second edge located at the first light-outgoing surface 212b, the third edge located at the second light-outgoing surface 213b and the fourth edge located at the fifth surface 215b form the quadrangle. For example, the quadrangle is a right-angled trapezoid.

For example, in the backlight source provided by at least one embodiment of the present disclosure, the polarizer component further includes a light conversion layer, and the light conversion layer is disposed in a light path of the light emitted from the second light-outgoing surface. For example, as shown in FIG. 4, the light conversion layer 220 is located on the second light-outgoing surface 213b. The light conversion layer 220 is, for example, used to convert a polarization state of the light emitted from the second light-outgoing surface and/or to eliminate the polarized light which has a certain polarization state in the light emitted from the second light-outgoing surface, so as to eliminate the interference light ray and increase the amount of the light having the first polarization direction and being emitted out from the backlight source.

For example, in some embodiments of the present disclosure, the light conversion layer is configured to absorb the portion which is included by the first sub-ray and which is emitted out from the second light-outgoing surface and is configured to convert the portion which is included by the second light ray and which is emitted out from the second light-outgoing surface into the light having the first polarization direction. In this way, the second light ray reflected at the first light-outgoing surface is converted to have the first polarization direction, which increases the utilization rate of the light emitted from the light source. For example, for the embodiments shown in FIGS. 1, 2A and 2B, in the situation where $\theta$=37.1°, the transmittance of the first light ray at the first light-outgoing surface 212 is about 80%, that is, the first sub-ray occupies about 20% of the first light ray, and only about 20% of the first light ray is absorbed by the light conversion layer. In this way, about 90% of the light emitted from the light source 100 under ideal conditions (for example, irrespective of the loss caused by the transmission of the light in the refractor and a half-wave plate) is converted into the light which is usable and which has the first polarization direction.

For example, in other embodiments of the present disclosure, the light conversion layer is configured to absorb the second light ray in the light emitted from the second light-outgoing surface and is configured to transmit the portion which is included in the first sub-ray and which is emitted from the second light-outgoing surface. In this way, the first sub-ray is separated from the light emitted from the second light-outgoing surface, and the utilization rate of the first light ray is improved.

For example, in the backlight source provided by at least one embodiment of the present disclosure, the polarizer component further includes a reflector, and the reflector is located in the light path of the light emitted from the second light-outgoing surface of the refractor. For example, the reflector is configured to adjust the light emitted from the second light-outgoing surface so that the light emitted from the second light-outgoing surface is emitted from the light-outgoing side of the backlight source. The reflector is for example used to adjust a propagation direction of the light emitted from the second light-outgoing surface, thereby controlling the direction of the light emitted from the backlight source. For example, for the backlight source shown in FIG. 4, the second sub-ray (for example, the E light) emitted from the first light-outgoing surface 212b is directed toward the light-outgoing side of the backlight source, and the light emitted from the second light-outgoing surface 213b is directed toward a side opposite to the light-outgoing side of the backlight source; and the light emitted from the second light-outgoing surface 213b is guided to the light-outgoing side of the backlight source by the reflection of the reflector 230.

For example, in at least one embodiment of the present disclosure, as shown in FIG. 4, by using the reflector 230, the direction of the light emitted from the second light-outgoing surface 213b is adjusted to be parallel to the direction of the light emitted from the first light-outgoing surface 212b.

In at least one embodiment of the present disclosure, the structure of the light conversion layer is provided in various ways, and the position of the reflector is related to the structure of the light conversion layer. In the following, in at least one embodiment of the present disclosure, taking the case that the backlight source has the refractor as shown in FIG. 4 as an example, several ways of providing the light conversion layer and the reflector are described.

For example, in the backlight source provided by some embodiments of the present disclosure, the light conversion layer includes a first polarizing layer and a half-wave plate. For example, as shown in FIG. 4, the first polarizing layer 221 and the half-wave plate 222 of the light conversion layer 220 are sequentially disposed in the light path of the light emitted from the refractor 210b, and an absorption axis of the first polarizing layer 221 is parallel to the first polarization direction and is perpendicular to the second polarization direction. In this way, for the light (for example, the first sub-ray) having the first polarization direction and the light (for example, the second light ray) having the second polarization direction which are emitted from the second light-outgoing surface 213b of the refractor 210b, the first sub-ray is absorbed by the first polarizing layer 221, the second light ray passes through the first polarizing layer 221 and enters the half-wave plate 222, and the second light ray is converted by the half-wave plate 222 into light having the first polarization direction.

For the birefringent crystal having a certain thickness, in a situation where the light incident in a normal direction is transmitted, a phase difference between the ordinary light (O light) and the extraordinary light (E light) is equal to π or an odd multiple of π, and such birefringent crystal is called as ½ wave plate (referred to as half-wave plate). The half-wave plate deflects a vibration plane of the incident light (that is, deflects the polarization direction of the incident light). For example, a thickness of the half-wave plate is designed so that the vibration plane of the outgoing light is rotated by an angle of 2 A relative to the vibration plane of the incident light, and the angle A is an included angle between the vibration plane of the incident light and an optical axis of the half-wave plate. For example, the angle A is 45 degrees, the linearly polarized light is still linearly polarized after passing through the half-wave plate but the vibration plane of the light is rotated by 90 degrees after passing through the half-wave plate, that is, the polarization direction of the outgoing light is perpendicular to the polarization direction of the incident light.

Figure 5A:
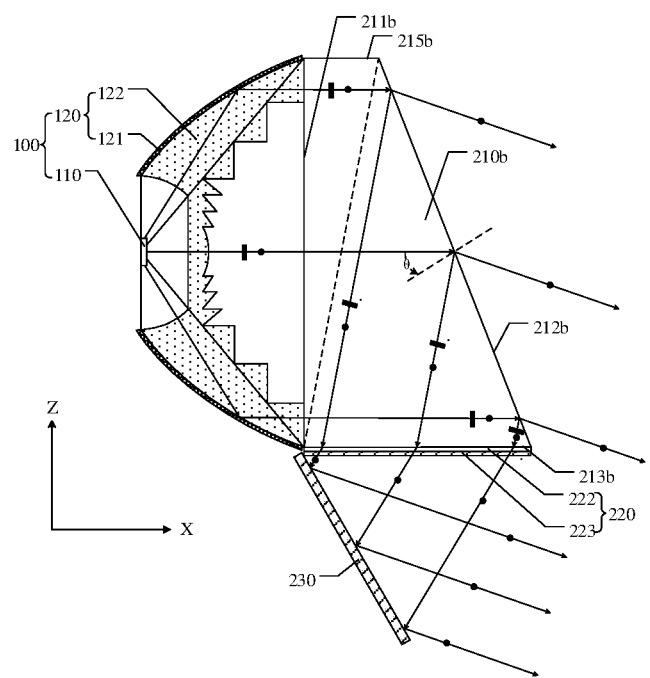
FIG. 5A is a cross-sectional view of the backlight source provided by some other embodiments of the present disclosure.

For example, in the backlight source provided by other embodiments of the present disclosure, the light conversion layer includes a second polarizing layer and the half-wave plate. For example, as shown in FIG. 5A, the half-wave plate 222 and the second polarizing layer 223 of the light conversion layer 220 are sequentially disposed in the light path of the light emitted from the refractor 210b, and an absorption axis of the second polarizing layer 223 is parallel to the second polarization direction and is perpendicular to the first polarization direction. As such, for the light (for example, the first sub-ray) having the first polarization direction and the light (for example, the second light ray) having the second polarization direction which are emitted from the second light-outgoing surface 213b of the refractor 210b, the first sub-ray is converted into the light having the second polarization direction by the half-wave plate 222, the second light ray is converted into the light having the first polarization direction by the half-wave plate 222, and then the second polarizing layer 223 absorbs the light which has the second polarization direction after transmitting through the half-wave plate 222 and transmits the light which has the first polarization direction after transmitting through the half-wave plate 222.

For example, in the backlight source provided by other embodiments of the present disclosure, the light conversion layer and the reflector are sequentially disposed in the light path of the light emitted from the refractor. For example, as shown in FIG. 4 and FIG. 5A, the light conversion layer 220 is located on the second light-outgoing surface 213b of the refractor 210b, and the light emitted from the second light-outgoing surface 213b firstly passes through the light conversion layer 220 and then is reflected by the reflector 230. For example, in a situation where the light conversion layer includes the first polarizing layer and the half-wave plate, the first polarizing layer and the half-wave plate are sequentially stacked on the second light-outgoing surface 213b of the refractor 210b as shown in FIG. 4; or, in a situation where the light conversion layer includes the second polarizing layer and the half-wave plate, the half-wave plate and the second polarizing layer are sequentially stacked on the second light-outgoing surface 213b of the refractor 210b as shown in FIG. 5A.

Figure 5B:
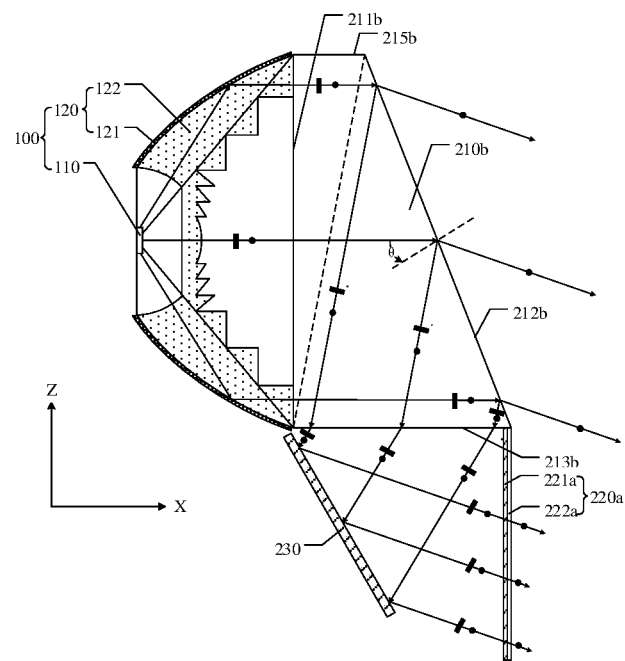
FIG. 5B is a cross-sectional view of the backlight source provided by some other embodiments of the present disclosure.

For example, in the backlight source provided by other embodiments of the present disclosure, the reflector and the light conversion layer are sequentially disposed in the light path of the light emitted from the refractor. For example, as shown in FIG. 5B, the light emitted from the second light-outgoing surface 213b is reflected by the reflector 230 and then enters the light conversion layer 220a. For example, in the situation where the light conversion layer includes the first polarizing layer and the half-wave plate, as shown in FIG. 5B, the first polarizing layer 221a and the half-wave plate 222a of the light conversion layer 220a are sequentially disposed in the light path of the light reflected by the reflector 230; or, in the situation where the light conversion layer includes the second polarizing layer and the half-wave plate, the half-wave plate and the second polarizing layer are sequentially disposed in the light path of the light reflected by the reflector.

Figure 5C:
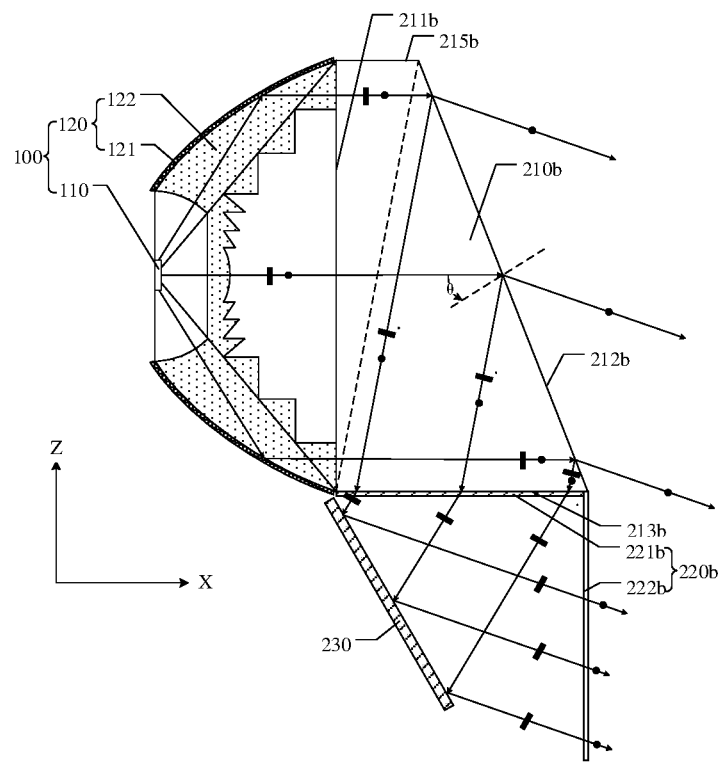
FIG. 5C is a cross-sectional view of the backlight source provided by some other embodiments of the present disclosure.

For example, in the backlight source provided by other embodiments of the present disclosure, in the situation where the light conversion layer includes the first polarizing layer and the half-wave plate, the first polarizing layer, the reflector and the half-wave plate are sequentially disposed in the light path of the light emitted from the second light-outgoing surface of the refractor. For example, in the backlight source provided by some other embodiments of the present disclosure, in the situation where the light conversion layer includes the second polarizing layer and the half-wave plate, the half-wave plate, the reflector and the second polarizing layer are sequentially disposed in the light path of the light emitted from the second light-outgoing surface of the refractor. For example, as shown in FIG. 5C, the light conversion layer 220b includes the first polarizing layer 221b and the half-wave plate 222b, the first polarizing layer 221b is located on the second light-outgoing surface 213b of the refractor 210b, the light emitted from the second light-outgoing surface 213b firstly enters the first polarizing layer 221b, the second light ray that is transmitted through the first polarizing layer 221b is reflected by the reflector 230 and then enters the half-wave plate 222b, and the second light ray is converted into light having the first polarization direction by the half-wave plate 222b.

Figure 5D:
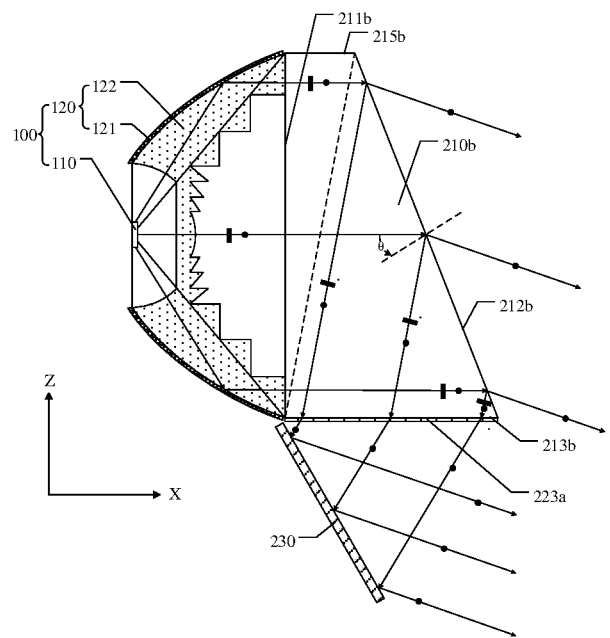
FIG. 5D is a cross-sectional view of the backlight source provided by some other embodiments of the present disclosure.

For example, in the backlight source provided by at least one embodiment of the present disclosure, the light conversion layer includes the second polarizing layer, the second polarizing layer is located in the light path of the light emitted from the second light-outgoing surface, and the absorption axis of the second polarizing layer is parallel to the second polarization direction and is perpendicular to the first polarization direction. In this way, for the light emitted from the second light-outgoing surface of the refractor (for example, the first sub-ray having the first polarization direction and the second light ray having the second polarization direction), the first sub-ray passes through the second polarizing layer, and the second light ray is absorbed by the second polarizing layer. For example, as shown in FIG. 5D, the light conversion layer includes the second polarizing layer 223a; for the first sub-ray and the second light ray which are emitted from the second light-outgoing surface 213b of the refractor 210b, the second light ray is absorbed by the second polarizing layer 223a, and the first sub-ray passes through the second polarizing layer 223a and then is reflected by the reflector 230.

For example, in at least one embodiment of the present disclosure, the shape of the refractor is designed so that the light emitted from the second light-outgoing surface is directly emitted from the light-outgoing side of the backlight source. In this way, for example, the reflector or the like is not required to adjust the direction of the light, so that the structure of the backlight source is simplified and the volume of the backlight source is reduced.

Figure 6:
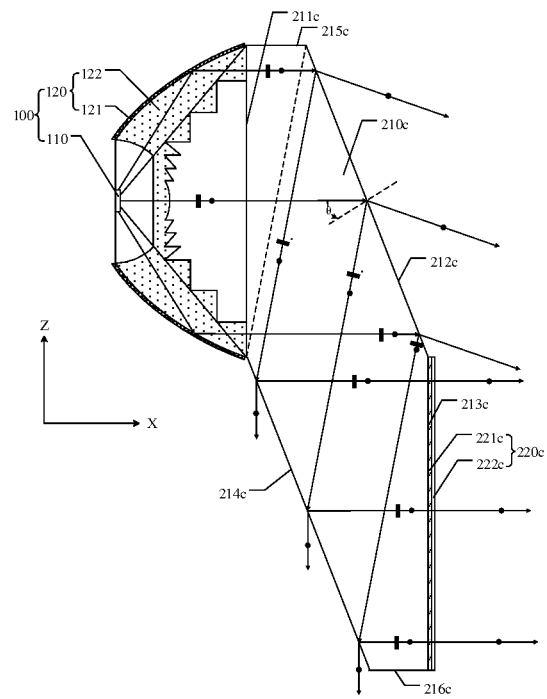
FIG. 6 is a cross-sectional view of the backlight source provided by some other embodiments of the present disclosure.

For example, in the backlight source provided by at least one embodiment of the present disclosure, the refractor further includes a third surface, the third surface and the second light-outgoing surface are sequentially located in the light path of the light reflected by the first light-outgoing surface, at least a portion which is included by the first sub-ray and the second light ray and which is reflected by the first light-outgoing surface is reflected at the third surface and refracted at the second light-outgoing surface, and the second light-outgoing surface is located on the light-outgoing side of the backlight source. For example, as shown in FIG. 6, the refractor 210c includes the first light incident surface 211c, the fifth surface 215c, the first light-outgoing surface 212c, the second light-outgoing surface 213c, the sixth surface 216c and the third surface 214c, which are sequentially connected; the third surface 214c is connected with the first light incident surface 211c; the first light incident surface 211c, the fifth surface 215c, the first light-outgoing surface 212c, the second light-outgoing surface 213c, the sixth surface 216c and the third surface 214c form a hexagon in the X-Z plane. The light (the first light ray and the second light ray) is reflected by the first light-outgoing surface 212c, then is incident on the third surface 214c and is at least partially reflected at the third surface 214c, and the light reflected at the third surface 214c is emitted out from the refractor 210c by means of being refracted at the second light-outgoing surface 213c. In this way, for example, the light emitted from the second light-outgoing surface 213c is emitted from the light-outgoing side of the backlight source, and it is not necessary to adjust the direction of the light by providing the reflector or the like. For example, the first light incident surface 211c, the fifth surface 215c and the first light-outgoing surface 212c in FIG. 6 respectively reference to the first light incident surface 211, the fifth surface 215 and the first light-outgoing surface 212 shown in FIG. 1, and the sixth surface 216c is parallel to the fifth surface 215c.

For example, in the backlight source provided by some embodiments of the present disclosure, an incident angle of the light at the third surface is less than the total reflection critical angle of the second light ray at the third surface. In this way, the first sub-ray and the second light ray are partially reflected and partially refracted at the third surface, and the portions, reflected by the third surface, of the first sub-ray and the second light ray are directed toward the second light-outgoing surface. For example, the incident angle of the first light ray (E light) and the second light ray (O light) at the first light-outgoing surface is θ, and an included angle between the first light incident surface and the third surface is less than (180°−θ).

For example, in the backlight source provided by other embodiments of the present disclosure, the incident angle of the light at the third surface is not less than the total reflection critical angle of the second light ray at the third surface and is less than the total reflection critical angle of the first sub-ray at the third surface. For example, as shown in FIG. 6, the second light ray is totally reflected at the third surface 214c, and the first sub-ray is partially reflected and partially refracted at the third surface 214c. The portions, reflected by the third surface 214c, of the first sub-ray and the second light ray is emitted from the second light-outgoing surface 213c. For example, the incident angle of the first light ray (E light) and the second light ray (O light) at the first light-outgoing surface is θ, the incident angle θ is equal to the total reflection critical angle of the second light ray, and the included angle between the first light incident surface and the third surface is greater than or equal to (180°−θ). For example, the first light-outgoing surface 212c is parallel to the third surface 214c, and the first light incident surface 211c is parallel to the second light-outgoing surface 213c; thus, the direction of the light emitted from the second light-outgoing surface 213c is perpendicular to the second light-outgoing surface 213c.

For example, the light conversion layer is provided on the second light-outgoing surface, and the light conversion layer is configured to absorb the smaller amount of light (i.e. the first sub-ray) having the first polarization direction and is configured to convert the larger amount of light (i.e. the second light ray) having the second polarization direction into light having the first polarization direction. For example, as shown in FIG. 6, the light conversion layer 220c includes the first polarizing layer 221c and the half-wave plate 222c, and the first polarizing layer 221c and the half-wave plate 222c are sequentially disposed in the light path of the light emitted from the second light-outgoing surface 213c of the refractor 210c. For example, the light conversion layer is configured to include the second polarizing layer and the half-wave plate, and the half-wave plate and the second polarizing layer are sequentially disposed in the light path of the light emitted from the second light-outgoing surface of the refractor.

For example, in the backlight source provided by at least one embodiment of the present disclosure, the incident angle of the second light ray at the third surface is not less than the total reflection critical angle of the second light ray at the third surface. In this way, the second light ray is totally reflected at the third surface, so that all the second light ray reflected at the first light-outgoing surface is directed toward the second light-outgoing surface. For example, in the backlight source provided by at least one embodiment of the present disclosure, the incident angle of the first sub-ray at the third surface is not less than the total reflection critical angle of the first light ray at the third surface. In this way, the first sub-ray is totally reflected at the third surface, so that all the first sub-ray reflected at the first light-outgoing surface is directed toward the second light-outgoing surface. For example, in a situation where the light emitted from the light source is the parallel light beam and the parallel light beam enters the refractor by means of being perpendicular to the first light incident surface, the incident angle of the light at the third surface is not less than the total reflection critical angle of the first sub-ray, and the first sub-ray and the second light ray are totally reflected at the third surface.

Figure 7:
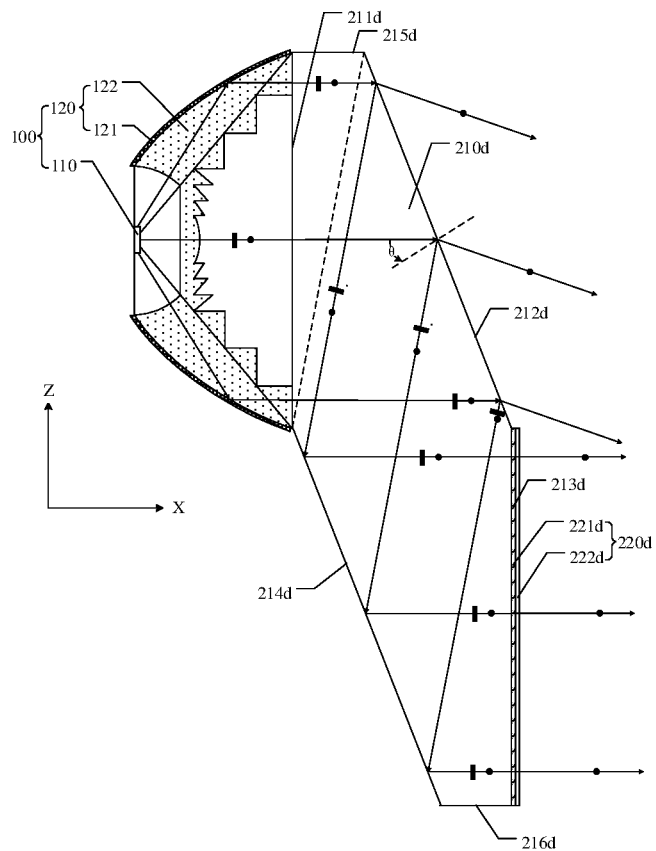
FIG. 7 is a cross-sectional view of the backlight source provided by some other embodiments of the present disclosure.

For example, as shown in FIG. 7, the refractor 210d includes the first light incident surface 211d, the fifth surface 215d, the first light-outgoing surface 212d, the second light-outgoing surface 213d, the sixth surface 216d and the third surface 214d which are sequentially connected; the third surface 214d is connected to the first light incident surface 211d; the first light incident surface 211d, the fifth surface 215d, the first light-outgoing surface 212d, the second light-outgoing surface 213d, the sixth surface 216d and the third surface 214d form a hexagon in the X-Z plane. The first light incident surface 211d, the fifth surface 215d and the first light-outgoing surface 212d in FIG. 7 for example reference to the first light incident surface 211, the fifth surface 215 and the first light-outgoing surface 212 shown in FIG. 1. As shown in FIG. 7, the incident angle of the light at the third surface is greater than or equal to the total reflection critical angle of the first sub-ray; in this way, the first sub-ray and the second light ray are totally reflected at the third surface, and all of the first sub-ray and the second light ray are directed to the second light-outgoing surface 213d. For example, the incident angle of the first light ray (E light) and the second light ray (O light) at the first light-outgoing surface is θ, the incident angle θ is greater than or equal to the total reflection critical angle of the second light ray at the first light-outgoing surface and is less than the total reflection critical angle of the first light ray at the first light-outgoing surface, and the included angle between the first light incident surface 211c and the third surface 214c is greater than or equal to (180°−θ).

For example, the light conversion layer is provided on the second light-outgoing surface, and the light conversion layer is configured to absorb the smaller amount of light (i.e. the first sub-ray) having the first polarization direction and is configured to convert the larger amount of light (i.e. the second light ray) having the second polarization direction into light having the first polarization direction. For example, as shown in FIG. 7, the light conversion layer 220d includes the first polarizing layer 221d and the half-wave plate 222d, and the first polarizing layer 221d and the half-wave plate 222d are sequentially disposed in the path of the light emitted from the second light-outgoing surface 213d of the refractor 210d. For example, the light conversion layer is configured to include the second polarizing layer and the half-wave plate, and the half-wave plate and the second polarizing layer are sequentially disposed in the light path of the light emitted from the second light-outgoing surface of the refractor.

For example, in the backlight source provided by at least one embodiment of the present disclosure, the light source includes a light emitter and a light direction controller element, and the light direction controller element is located between the light emitter and the polarizer component; the light direction controller element is configured to adjust light emitted from the light emitter into the parallel beam which enters the refractor. For example, as shown in FIG. 7, the light emitted from the light emitter 110 of the light source 100 enters the light direction controller element 120, and the light direction controller element 120 adjusts the light into the parallel light beam to enter the refractor 210d.

For example, in the backlight source provided by some embodiments of the present disclosure, as shown in FIG. 7, the light direction controller element 120 includes a paraboloidal reflector 121 and a Fresnel lens 122, the light emitter 110 is located at a focal point of the paraboloidal reflector 121, the Fresnel lens 122 is located between the light emitter 110 and the polarizer component (not shown, such as the refractor 210d of the polarizer component), and a center of the Fresnel lens 122 is located at an axis of the paraboloidal reflector. In this way, the light emitted from the light emitter 110 has a portion directed toward the paraboloidal reflector 121, and the paraboloidal reflector 121 converts a propagation direction of this portion of the light to be parallel to the symmetry axis of the paraboloidal reflector 121 (the focal point of the paraboloidal reflector 121 is at this axis); the light emitted from the light emitter 110 has a portion directed to the Fresnel lens 122, and the Fresnel lens 122 converts a propagation direction of this portion of the light to be parallel to the symmetry axis of the Fresnel lens 122 (the symmetry axis of the paraboloidal reflector 121). For example, the light emitter is a Lambert light emitter; for example, the light emitter is an OLED (organic light-emitting diode) light emitting device.

It should be noted that, for the light emitted from the light emitter, a reflection sheet, a grating or the like may be provided to adjust the propagation direction of the light to obtain the parallel light beam. In at least one embodiment of the present disclosure, the structure of the light source is not limited, and may be selected according to actual needs.

At least one embodiment of the present disclosure provides a backlight module including the backlight source in any one of the above embodiments.

For example, the backlight module provided by at least one embodiment of the present disclosure further includes a light guide plate, and the light guide plate includes a light incident surface and a light-outgoing surface; the light emitted from the backlight source enters the light guide plate at the light incident surface and exits the light guide plate at the light-outgoing surface. The light guide plate, for example, converts a point light source emitted from the backlight source into a surface light source; for example, the light guide plate provides light for display to a display panel.

Figure 8A:
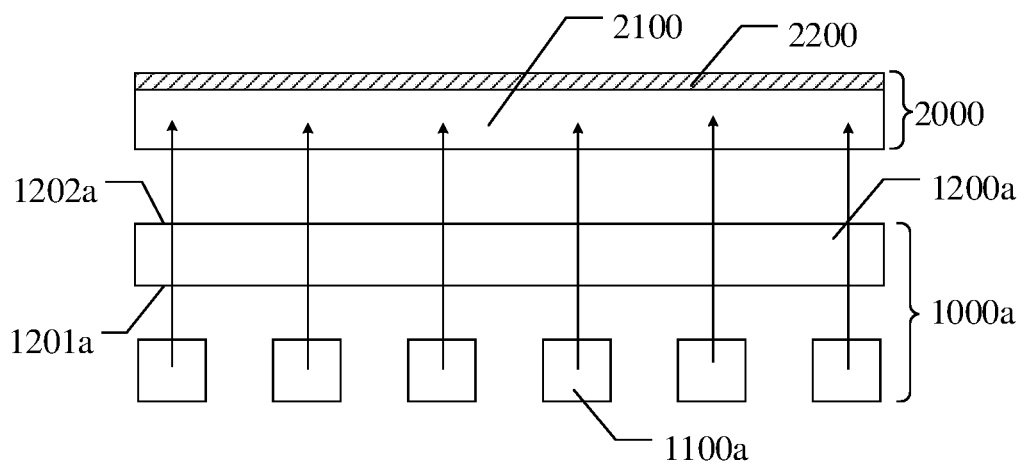
FIG. 8A is a cross-sectional view of a display device provided by some embodiments of the present disclosure.

For example, in some embodiments of the present disclosure, the backlight module is configured as a direct type backlight module. For example, as shown in FIG. 8A, the backlight module 1000a includes the light guide plate 1200a and a plurality of backlight sources 1100a, two opposite main surfaces of the light guide plate 1200a are respectively used as the light incident surface 1201a and the light-outgoing surface 1202a, and the backlight sources 1100a are located at a side where the light incident surface 1201a of the light guide plate 1200a is located. In this way, the light emitted from the backlight sources 1100a enters the light guide plate 1200a at the light incident surface 1201a and exits at the light-outgoing surface 1202a of the light guide plate 1200a. For example, grid dots are provided at the light incident surface 1201a and/or the light-outgoing surface 1202a of the light guide plate 1200a; the light incident surface 1201a and/or the light-outgoing surface 1202a of the light guide plate 1200 for example is provided with an optical film such as a diffusion sheet. The grid dots and the optical film disperse the light emitted from the backlight sources 1100a, so that the backlight module emits light with a uniform brightness distribution.

Figure 8B:
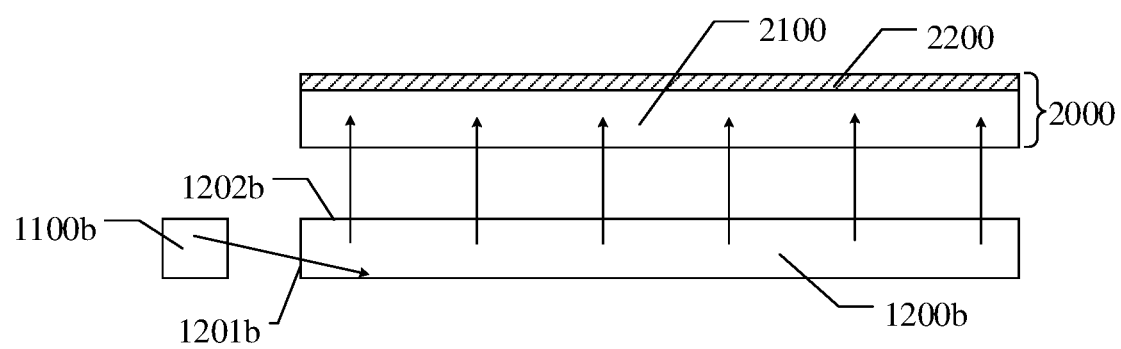
FIG. 8B is a cross-sectional view of the display device provided by some other embodiments of the present disclosure.

For example, in some embodiments of the present disclosure, the backlight module is configured as a side-type backlight module. For example, as shown in FIG. 8B, the backlight module 1000b includes the light guide plate 1200b and the backlight source 1100b, a lateral surface and a main surface of the light guide plate 1200b respectively serve as the light incident surface 1201b and the light-outgoing surface 1202b, and the backlight source 1100b is located on a side where the light incident surface 1201b of the light guide plate 1200b is located. In this way, the light emitted from the backlight source 1100b enters the light guide plate 1200b at the light incident surface 1201b and exits at the light-outgoing surface 1202b of the light guide plate 1200b. For example, in a direction parallel to the light incident surface 1201b, a plurality of backlight sources 1100b are provided. For example, the grid dots are provided on the light incident surface 1201b and/or the light-outgoing surface 1202b of the light guide plate 1200b, and the optical film such as a diffusion sheet for example is provided on the light incident surface 1201b and/or the light-outgoing surface 1202b of the light guide plate 1200b. The grid dots and the optical film disperses the light emitted from the backlight source 1100b, so that the backlight module emits the light with the uniform brightness distribution. The thickness of the side-type backlight module is small, which is conducive to a light and thin design of products (such as display device).

At least one embodiment of the present disclosure provides a display device including the backlight module according to any one of the above embodiments. For example, the display device is a liquid crystal display device.

For example, the display device provided by at least one embodiment of the present disclosure further includes a transmissive liquid crystal display panel, the liquid crystal display panel includes a third polarizing layer provided on a display side of the liquid crystal display panel, and the backlight module is on a non-display side of the liquid crystal display panel. For example, as shown in FIGS. 8A and 8B, the display device includes the liquid crystal display panel 2000, and the liquid crystal display panel 2000 includes a cell structure 2100 and the third polarizing layer 2200. For example, the cell structure 2100 include a first substrate and a second substrate opposite to each other to form a cell, and further includes a liquid crystal layer sandwiched between the first substrate and the second substrate. For example, the first substrate is an array substrate, and the second substrate is a color filter substrate. Generally, the liquid crystal display device needs to include two polarizers on two sides (a non-display side and a display side) of the liquid crystal layer of the display panel to achieve display. In the embodiments of the present disclosure, the light emitted from the backlight source (backlight module) is linearly polarized light (light having the first polarization direction). In this way, for example, no polarizer is provided on the non-display side of the display panel, which simplifies the structure of the display panel. In addition, on the non-display side of the display panel, the light emitted from the backlight module is not absorbed by the polarizer, and the utilization rate of the light emitted from the backlight module is high.

For example, in some embodiments of the present disclosure, the third polarizing layer is disposed inside the cell structure. For example, during manufacturing the cell structure, the third polarizing layer is manufactured on the second substrate (such as the color filter substrate), and then the first substrate and the second substrate are arranged to be opposite to each other to form the liquid crystal display panel. For example, in other embodiments of the present disclosure, the third polarizing layer is located on the display side of the cell structure 2100 as shown in FIGS. 8A and 8B; after the first substrate and the second substrate are arranged to be opposite to each other to form the cell structure, the third polarizing layer is provided (e.g., adhered) on the display side of the cell structure.

For example, as shown in FIGS. 8A and 8B, a polarization direction of the third polarizing layer 2200 is set to be perpendicular to the first polarization direction, that is, an absorption axis of the third polarizing layer 2200 is parallel to the first polarization direction.

For example, in at least one embodiment of the present disclosure, the display device may be any product or component having a display function, such as a television, a digital camera, a mobile phone, a watch, a tablet computer, a notebook computer, a navigator, and the like.

It should be noted that, for clarity, the present disclosure does not present all the structures of the backlight source, the backlight module and the display device in at least one embodiment. In order to achieve the necessary functions of the backlight source, the backlight module and the display device, those skilled in the art may set other structures according to specific application situations, which are not limited in the embodiments of the present disclosure. For example, the display panel of the display device may be provided with a structure having a touch function.

For this disclosure, the following points need to be explained.

(1) The drawings of the embodiments of the present disclosure only relate to the structures related to the embodiments of the present disclosure. For other structures, refer to the general designs.

(2) For clarity, in the drawings for describing the embodiments of the present disclosure, the thicknesses of layers or regions are enlarged or reduced, that is, these drawings are not drawn to actual scale.

(3) In the case of no conflict, the embodiments of the present disclosure and features in the embodiments can be combined with each other to obtain a new embodiment.

What are described above is related to the illustrative embodiments of the disclosure only and not limitative to the scope of the disclosure; the scopes of the disclosure are defined by the accompanying claims.

What is claimed is:

1. A backlight source comprising a light source and a polarizer component, wherein
    the light source is configured to emit light to the polarizer component, the polarizer component is configured to convert the light emitted from the light source into polarized light, and the polarizer component comprises a birefringent material;
    the polarizer component comprises: a refractor, comprising a first light incident surface and a first light-outgoing surface which are opposite to each other, and comprising a second light-outgoing surface provided between the first light incident surface and the first light-outgoing surface, wherein the first light-outgoing surface is on a light-outgoing side of the backlight source;
    the refractor comprises the birefringent material, the light emitted from the light source is decomposed into a first light ray having a first polarization direction and a second light ray having a second polarization direction after the light emitted from the light source enters the refractor, and the first polarization direction is perpendicular to the second polarization direction; and
    at the first light-outgoing surface, a portion of the first light ray is reflected as a first sub-ray, the other portion of the first light ray is refracted as a second sub-ray, and the second light ray is totally reflected.

2. The backlight source according to claim 1, wherein
    at the first light-outgoing surface, an incident angle of the first light ray is less than a total reflection critical angle of the first light ray, and an incident angle of the second light ray is not less than a total reflection critical angle of the second light ray;
    the incident angle of the first light ray is equal to the incident angle of the second light ray, and the total reflection critical angle of the first light ray is greater than the total reflection critical angle of the second light ray.

3. The backlight source according to claim 2, wherein
    the refractor comprises a first cross-section, and the first cross section comprises a first edge at the first light incident surface, a second edge at the first light-outgoing surface and a third edge at the second light-outgoing surface; and
    a shape of the first cross section is a triangle comprising the first edge, the second edge and the third edge.

4. The backlight source according to claim 2, wherein
    the refractor comprises a first cross-section, and the first cross section comprises a first edge at the first light incident surface, a second edge at the first light-outgoing surface, and a third edge at the second light-outgoing surface; and
    a shape of the first cross section is a quadrangle or a polygon.

5. The backlight source according to claim 4, wherein
    a direction of the light emitted from the light source is perpendicular to the first light incident surface, the incident angle of the first light ray at the first light-outgoing surface and the incident angle of the second light ray at the first light-outgoing surface are θ, a length of the first edge is a, a length of a portion which is comprised by the second edge and which overlaps the first edge in a direction perpendicular to the first light incident surface is b, and a and b satisfy $b=a/\sin(90°-\theta)$.

6. The backlight source according to claim 1, wherein
    a direction of the light emitted from the light source is perpendicular to the first light incident surface; and
    the second light-outgoing surface is in a light path of the first sub-ray and the second light ray which are reflected by the first light-outgoing surface, and the first sub-ray and the second light ray are refracted at the second light-outgoing surface.

7. The backlight source according to claim 6, wherein the polarizer component further comprises:
    a light conversion layer in a light path of light emitted from the second light-outgoing surface;
    wherein the light conversion layer is configured to absorb a portion which is comprised by the first sub-ray and which is emitted from the second light-outgoing surface, and is configured to convert a portion which is comprised by the second light ray and which is emitted from the second light-outgoing surface into light having the first polarization direction.

8. The backlight source according to claim 7, wherein
    the light conversion layer comprises a first polarizing layer and a half-wave plate, the first polarizing layer and the half-wave plate are sequentially disposed in the light path of light emitted from the second light-outgoing surface, and an absorption axis of the first polarizing layer is parallel to the first polarization direction and is perpendicular to the second polarization direction; or
    the light conversion layer comprises a second polarizing layer and the half-wave plate, the half-wave plate and the second polarizing layer are sequentially disposed in the light path of light emitted from the second light-outgoing surface, and an absorption axis of the second polarizing layer is parallel to the second polarization direction and is perpendicular to the first polarization direction.

9. The backlight source according to claim 7, wherein
    the light conversion layer comprises a second polarizing layer, and the second polarizing layer is in the light path of the light emitted from the second light-outgoing surface; and
    an absorption axis of the second polarizing layer is parallel to the second polarization direction and is perpendicular to the first polarization direction.

10. The backlight source according to claim 7, wherein the polarizer component further comprises:
    a reflector in the light path of the light emitted from the second light-outgoing surface;

wherein the reflector is configured to adjust a direction of the light emitted from the second light-outgoing surface so that the light emitted from the second light-outgoing surface is emitted from the light-outgoing side of the backlight source; and along the light path of the light emitted from the second light-outgoing surface, the light conversion layer and the reflector are sequentially disposed, or the reflector and the light conversion layer are sequentially disposed.

11. The backlight source according to claim 8, wherein the polarizer component further comprises:

a reflector provided between the first polarizing layer and the half-wave plate along the light path of the light emitted from the second light-outgoing surface or provided between the second polarizing layer and the half-wave plate along the light path of the light emitted from the second light-outgoing surface, wherein the reflector is configured to adjust a direction of the light emitted from the second light-outgoing surface so that the light emitted from the second light-outgoing surface is emitted from the light-outgoing side of the backlight source.

12. The backlight source according to claim 7, wherein the refractor further comprises a third surface, the third surface and the second light-outgoing surface are sequentially disposed in a light path of light reflected by the first light-outgoing surface, at least a portion of the first sub-ray and the second light ray is reflected at the third surface and is refracted at the second light-outgoing surface, and the second light-outgoing surface is on the light-outgoing side of the backlight source.

13. The backlight source according to claim 12, wherein an incident angle of the second light ray at the third surface is not less than a total reflection critical angle of the second light ray at the third surface.

14. The backlight source according to claim 12, wherein the third surface is parallel to the first light-outgoing surface, and the second light-outgoing surface is parallel to the first light incident surface.

15. The backlight source according to claim 13, wherein an incident angle of the first sub-ray at the third surface is not less than a total reflection critical angle of the first sub-ray at the third surface.

16. The backlight source according to claim 1, wherein the light source comprises:

a light emitter and a light direction controller element, and the light direction controller element is provided between the light emitter and the refractor;

wherein the light direction controller element is configured to adjust light emitted from the light emitter into a parallel light beam which is incident into the refractor.

17. The backlight source according to claim 16, wherein the light direction controller element comprises a paraboloidal reflector and a Fresnel lens, the light emitter is at a focal point of the paraboloidal reflector, the Fresnel lens is provided between the light emitter and the refractor, and a center of the Fresnel lens is at an axis of the paraboloidal reflector.

18. A backlight module, comprising:

the backlight source according to claim 1; and a light guide plate comprising a light incident surface and a light-outgoing surface, wherein the light emitted from the backlight source enters the light guide plate at the light incident surface and exits the light guide plate at the light-outgoing surface.

19. A display device, comprising:

the backlight module according to claim 18; and a transmissive liquid crystal display panel, wherein the liquid crystal display panel comprises a third polarizing layer provided on a display side of the liquid crystal display panel, and the backlight module is provided on a non-display side of the liquid crystal display panel.

* * * * *